S. FISCHER.
SAFETY GUARD FOR FOOT PEDALS.
APPLICATION FILED OCT. 29, 1917.
1,277,207.
Patented Aug. 27, 1918.
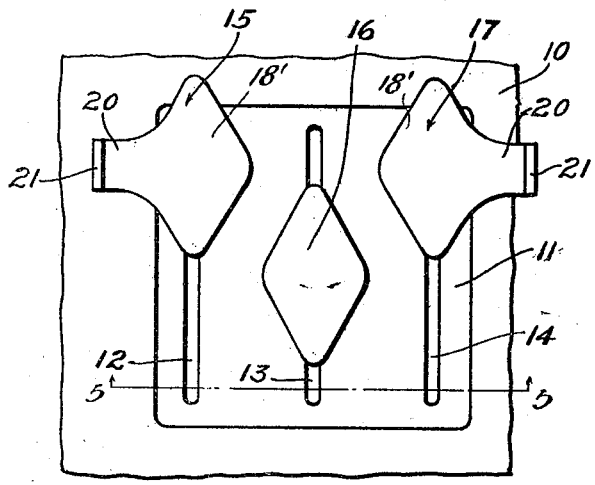
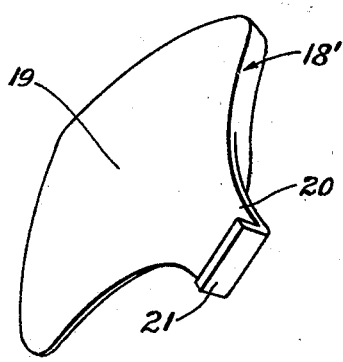
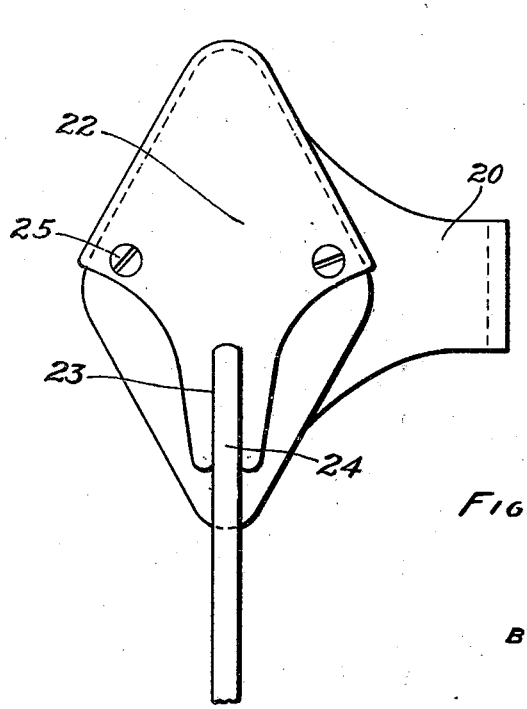
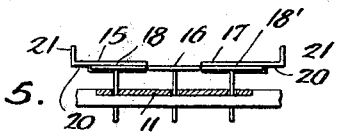
INVENTOR
SAMUEL FISCHER
BY Hazard and Miller
ATT'YS.

UNITED STATES PATENT OFFICE.

SAMUEL FISCHER, OF LOS ANGELES, CALIFORNIA.

SAFETY-GUARD FOR FOOT-PEDALS.

1,277,207.

Specification of Letters Patent.

Patented Aug. 27, 1918.

Application filed October 29, 1917. Serial No. 199,087.

*To all whom it may concern:*

Be it known that I, SAMUEL FISCHER, a citizen of the United States, residing at Los Angeles, in the county of Los Angeles and State of California, have invented new and useful Improvements in Safety-Guards for Foot-Pedals, of which the following is a specification.

This invention relates to a safety guard for foot pedals.

Many automobiles are designed with foot pedals having limited treadle portions so that it is very easy for the foot to slip from the treadle and cause the driver to lose control of the car. This is particularly true of automobiles of the Ford type where the clutch and speed changing transmission are both controlled by pedals. It is the principal object of this invention to provide a guard of simple construction which may be readily positioned over the treadle of the pedals to provide side extensions which will prevent the foot from readily slipping from the pedals, especially when the shoe is wet, and also increase the surface against which the foot rests, thus providing additional safety and comfort.

Other objects will appear hereinafter.

The invention is illustrated, by way of example, in the accompanying drawings in which:

Figure 1 is a view in elevation illustrating a fragmentary portion of the foot-board of a car of the Ford type and particularly disclosing the manner in which the pedal guards are mounted.

Fig. 2 is an enlarged view in perspective illustrating one of the pedal guards as disassociated from the pedal to which it is to be attached.

Fig. 3 is an enlarged view in rear elevation illustrating the manner in which the guard is fastened to the foot pad of the pedal.

Fig. 4 is a view in elevation illustrating the manner in which the pedal guard supports the foot and prevents it from slipping therefrom.

Fig. 5 is a vertical section on the line 5—5 of Fig. 1 and looking in the direction indicated by the arrow points and drawn for the purpose of showing the practically continuous floor between the stops at the outer sides of the outer pedals.

Referring more particularly to the drawings, 10 indicates a foot-board of an automobile upon which a pedal plate 11 is mounted. As shown in the drawings, three parallel slots 12, 13 and 14 are formed through the plate 11 to accommodate the shanks of a clutch pedal 15, a reversing gear pedal 16, and a brake pedal 17. These pedals are of similar construction and are designed with diamond-shaped foot pads. At the present time the dimensions of the pads are limited so that the sole of the shoe is not only worn but the foot often slips from the pad. In order to overcome this objection detachable guard members 18 and 18' are provided. These members are formed right and left-handed so that they may be positioned upon the clutch pedal and the brake pedal.

Each pedal guard 18 and 18' comprises a diamond-shaped pad 19 substantially corresponding in contour to the pedal pad. Extending from one side of this pad 19 is an extension portion 20 the outer end of which is up-turned to form a guard flange 21 against which the outer edge of the sole of the shoe may rest and by which the foot is prevented from slipping. The pad 19 is continued over the upper point of the pedal and is carried down behind the pedal with an extension 22. This extension bears directly upon the rear face of the pedal pad and is formed with an open-ended slot 23 into which the shank 24 of the pedal may rest and by which the guard is held against swinging movement. A series of set-screws 25 are threaded through the extension plate 22 and bear against the back of the pedal pad to securely clamp the guard in position.

In operation, the guards 18 and 18' are formed as shown in Fig. 2 and thereafter positioned over the pedal pad of the pedals 15 and 17 with the extensions 20 of each of the guards extending outwardly in opposite directions from the pedals.

Referring to Figs. 1 and 2, when the pedals are on a level, as shown in Fig. 5, the three pedals supplied with two safety guards in accordance with the principles of my invention provide a practically continuous floor between the stop 21 at the left-hand side of the guard 18 and the stop 21 at the right-hand side of the guard 18' so that there is no space for the operator's foot to fall between the pedals and so that as long as the operator's foot is within the plane between the two stops 21 the foot will always be upon a pedal. Heretofore it has required care for the operator to keep his foot upon a pedal. The foot was continually slipping off one way or the other.

It will thus be seen that the device here disclosed, while simple in its construction, provides an easily attached guard to prevent the foot from slipping from the pedal and to also provide a more comfortable and convenient pedal structure.

While I have shown the preferred construction of my safety guard for foot pedals as now known to me, it will be understood that various changes in the combination, construction, and arrangement of parts may be made by those skilled in the art without departing from the spirit of my invention as claimed.

I claim:

The combination of three control pedals arranged side by side, a detachable foot plate secured upon each of the outermost pedals, and a foot retaining projection on the outermost side of each plate, the inner side of each plate being unobstructed to allow the foot to pass freely from one pedal to the other.

In testimony whereof I have signed my name to this specification.

SAMUEL FISCHER.